(12) United States Patent
Yamauchi et al.

(10) Patent No.: US 12,449,537 B2
(45) Date of Patent: Oct. 21, 2025

(54) OPTICAL DISTANCE MEASUREMENT DEVICE

(71) Applicant: Mitsubishi Electric Corporation, Tokyo (JP)

(72) Inventors: Takanori Yamauchi, Tokyo (JP); Hiroki Goto, Tokyo (JP); Tsuyoshi Yoshida, Tokyo (JP); Kiyoshi Onohara, Tokyo (JP); Naoki Suzuki, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 1086 days.

(21) Appl. No.: 17/463,651

(22) Filed: Sep. 1, 2021

(65) Prior Publication Data

US 2021/0396880 A1 Dec. 23, 2021

Related U.S. Application Data

(63) Continuation of application No. PCT/JP2019/015131, filed on Apr. 5, 2019.

(51) Int. Cl.
*G01S 17/32* (2020.01)
*G01B 9/02004* (2022.01)
(Continued)

(52) U.S. Cl.
CPC .......... *G01S 17/32* (2013.01); *G01B 9/02004* (2013.01); *G01B 9/02027* (2013.01); *G01S 7/4814* (2013.01)

(58) Field of Classification Search
CPC ... G01B 9/02027; G01B 11/026; G01S 17/32; G01S 7/48–51
See application file for complete search history.

(56) References Cited

U.S. PATENT DOCUMENTS

2012/0200833 A1* 8/2012 Imai ..................... G02B 27/104
353/30
2014/0072003 A1* 3/2014 Matsumoto ........ B23K 26/1462
372/26

FOREIGN PATENT DOCUMENTS

JP 2009008421 A * 1/2009 ......... G01B 9/02027
JP 2014-89949 A 3/2014

OTHER PUBLICATIONS

Haruna. "Optical Coherence Tomography(OCT)," Medical Photonics, No. 1, Apr. 2010, 99. 1-7.

* cited by examiner

*Primary Examiner* — Yuqing Xiao
*Assistant Examiner* — Chia-Ling Chen
(74) *Attorney, Agent, or Firm* — Birch, Stewart, Kolasch & Birch, LLP

(57) ABSTRACT

An optical distance measurer includes: a beam splitter splitting a laser beam and outputting as measurement light and reference light; a measurement light beam splitter splitting the measurement light and outputting as first measurement light and second measurement light; a reference light beam splitter splitting the reference light and outputting as first reference light and second reference light; a first optical system having a first Rayleigh length, the first optical system emitting the first measurement light to a target object; and a second optical system having a second Rayleigh length different from the first Rayleigh length, the second optical system emitting the second measurement light to the target object; a first receiver receiving the first reference light and first reflection light that is the first measurement light reflected by the target object and outputting a first receiving signal indicating the first reference light and the first reflection light; and a second receiver receiving the second reference light and second reflection light that is (Continued)

the second measurement light reflected by the target object and outputting a second receiving signal indicating the second reference light and the second reflection light.

7 Claims, 7 Drawing Sheets

(51) Int. Cl.
  *G01B 9/02015* (2022.01)
  *G01S 7/481* (2006.01)

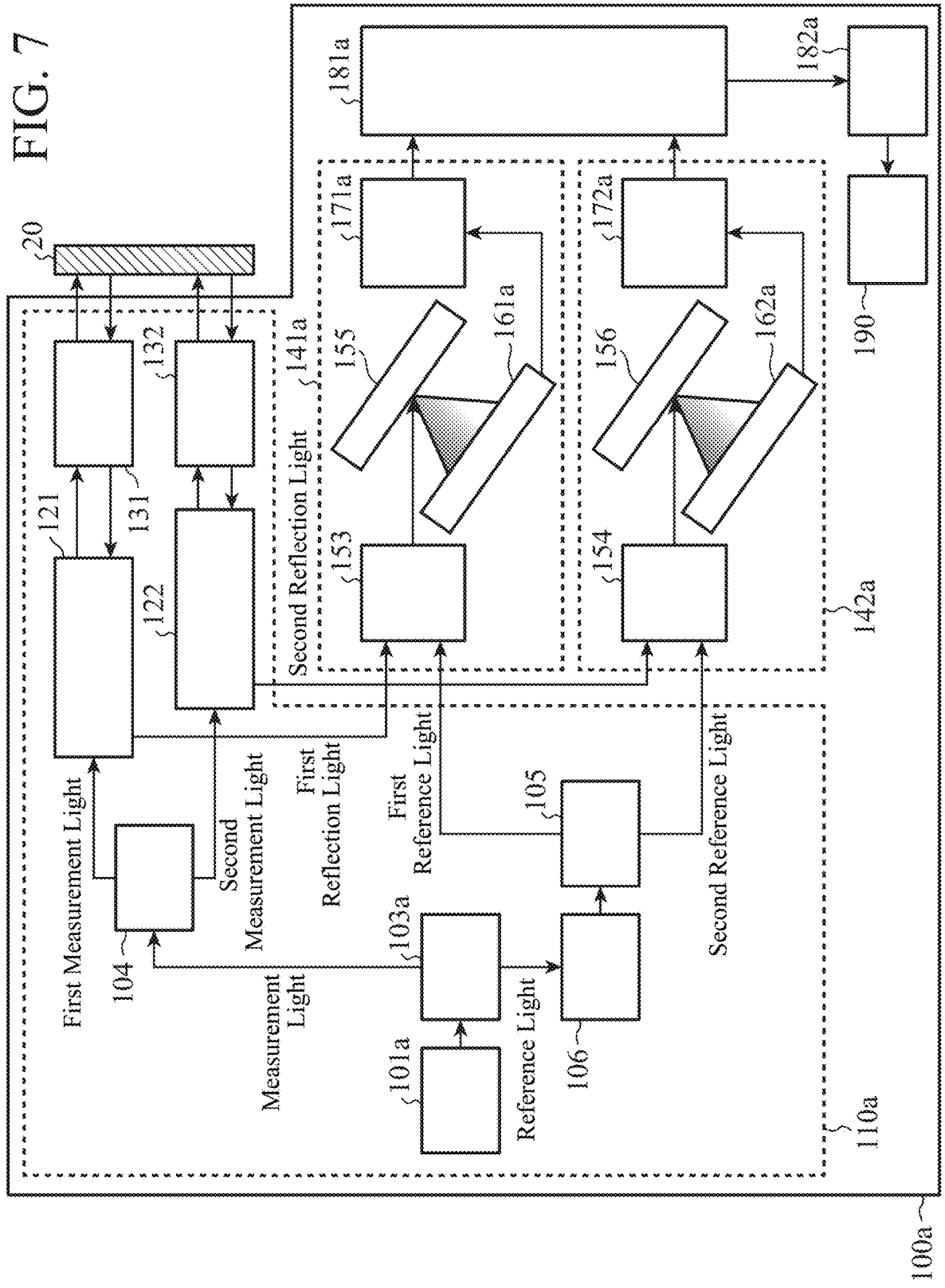

OPTICAL DISTANCE MEASUREMENT DEVICE

CROSS REFERENCE TO RELATED APPLICATION

This application is a Continuation of PCT International Application No. PCT/JP2019/015131, filed on Apr. 5, 2019, which is hereby expressly incorporated by reference into the present application.

TECHNICAL FIELD

The present invention relates to an optical distance measurer.

BACKGROUND ART

In optical ranging methods, a distance from a light source to a target object is measured using light emitted from the light source by a method such as a pulse propagation method, a triangular ranging method, a confocal method, a white light interferometry, or a wavelength scanning interferometry. Among these methods, the white light interferometry, the wavelength scanning interferometry, or the like uses the interference phenomenon of light.

In interferometry, light emitted from a light source is split into measurement light and reference light, reflection light that is light obtained by reflection of the measurement light on a target object and the reference light are caused to interfere with each other, and a distance from the light source to the target object is measured by referring to a condition that the reflection light and the reference light intensify with each other.

For example, in the white light interferometry such as a spectrum domain interferometry, a light source that emits broadband light is used. In the white light interferometry, the broadband light emitted from the light source is split into measurement light and reference light. In the white light interferometry, spectral dispersion is spatially performed by a spectroscope, and a distance from the light source to the target object is measured by referring to an interference condition between the spectrally dispersed reflection light and the spectrally dispersed reference light.

Meanwhile, for example, in the wavelength scanning interferometry, light emitted from a light source is wavelength-swept. In the wavelength scanning interferometry, the light that has been wavelength-swept is split into measurement light and reference light. In the wavelength scanning interferometry, interference is caused between reflection light, which is the measurement light obtained by splitting the wavelength-sweep light and reflected by a target object, and the reference light obtained by splitting the wavelength-sweep light. In the wavelength scanning interferometry, a distance from the light source to the target object is measured by measuring the frequency of the reflection light and the frequency of the reference light.

For example, Non-Patent Literature 1 discloses a swept source-optical coherence tomography (SS-OCT) in which an optical distance measurement device by a wavelength scanning interferometry is applied to medical applications.

CITATION LIST

Non-Patent Literature

Non-Patent Literature 1: Masamitsu Haruna, "Hikari coherence tomography (OCT)", [online], 2010, MEDICAL PHOTONICS, [searched on Feb. 4, 2019], the Internet <URL: http://www.medicalphotonics.jp/pdf/mp0001/0001_029.pdf>

SUMMARY OF INVENTION

Technical Problem

However, conventional optical distance measurement devices have a disadvantage that the range of distances from a light source to a target object that can be measured at a time is limited to the range of the focal length of an optical system that emits measurement light to a target object.

The present invention is intended to solve the above problem, and an object of the present invention is to provide an optical distance measurement device capable of measuring the distance to a target object with high accuracy while broadening the distance measurement range.

Solution to Problem

An optical distance measurer according to the present invention is a device comprising a transmitter, a first receiver, and a second receiver, the transmitter comprising: a beam splitter splitting a laser beam into measurement light and reference light and outputting the measurement light and the reference light, the laser beam the input of the beam splitter being a continuous wave; a measurement light beam splitter splitting the measurement light into first measurement light and second measurement light and outputting the first measurement light and the second measurement light; a reference light beam splitter splitting the reference light into first reference light and second reference light and outputting the first reference light and the second reference light; a first optical system having a first Rayleigh length, the first optical system emitting the first measurement light to a target object; and a second optical system having a second Rayleigh length different from the first Rayleigh length and a focal length equal to a focal length of the first optical system, the second optical system emitting the second measurement light to the target object; the first receiver receives the first reference light and first reflection light and outputs a first receiving signal having information on both the first reference light and the first reflection light, the first reflection light being a reflected light reflected at the target object and originally being the first measurement light; and the second receiver receives the second reference light and second reflection light and outputs the second receiving signal having information on both the second reference light and the second reflection light, the second reflection light being another reflected light reflected at the target object and originally being the second measurement light.

Advantageous Effects of Invention

According to the present invention, the distance to a target object can be measured with high accuracy while broadening the distance measurement range.

BRIEF DESCRIPTION OF DRAWINGS

FIG. 7 is a block diagram illustrating an example of the configuration of the main part of an optical distance measurer according to a second embodiment.

DESCRIPTION OF EMBODIMENTS

Figure 1:
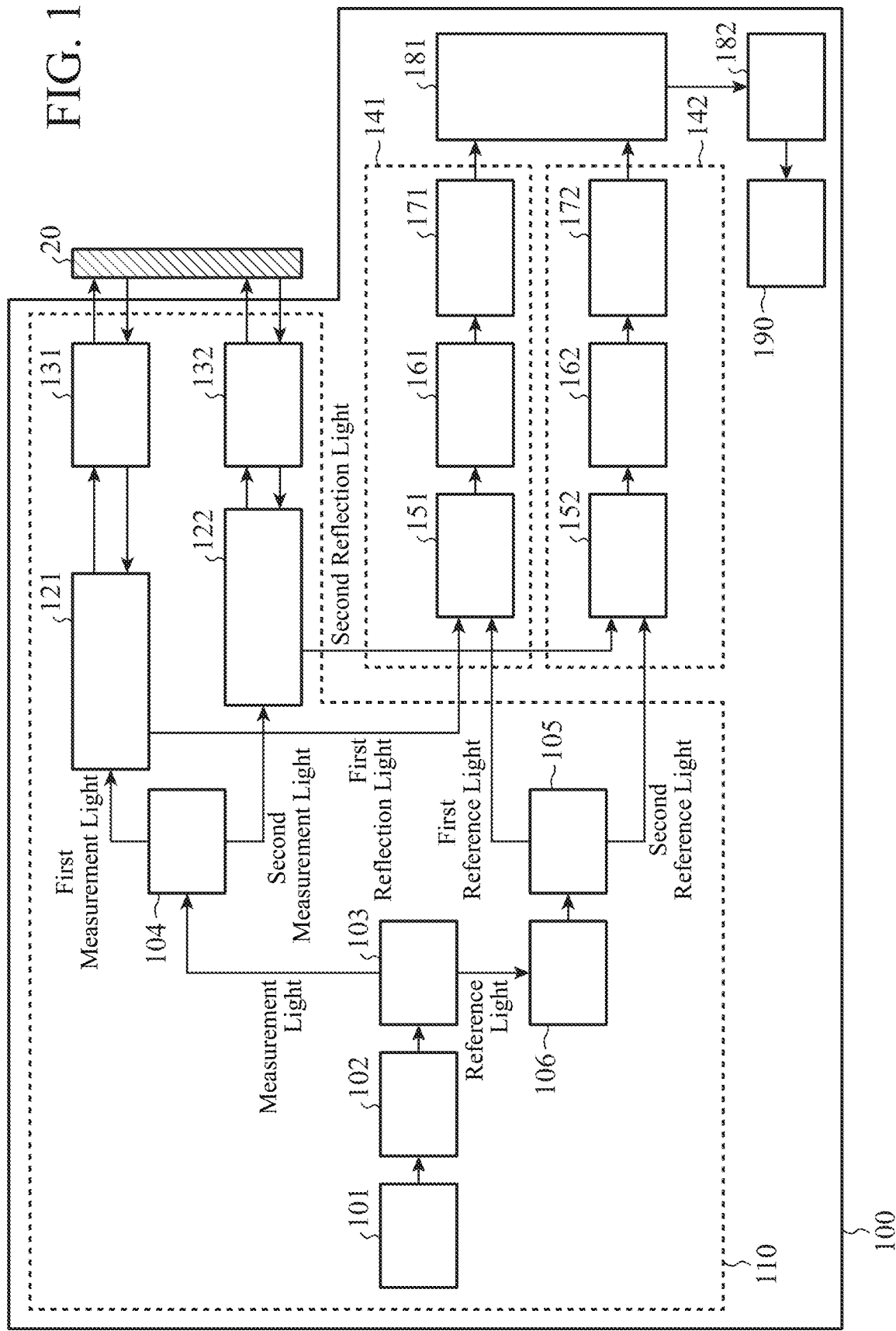
FIG. 1 is a block diagram illustrating an example of the configuration of the main part of an optical distance measurer according to a first embodiment.

Hereinafter, embodiments of the present invention will be described in detail by referring to the drawings.

First Embodiment

FIG. 1 is a block diagram illustrating an example of the configuration of the main part of an optical distance measurer 100 according to a first embodiment.

The optical distance measurer 100 includes a laser light source 101, a wavelength sweeper 102, a beam splitter 103, a measurement light beam splitter 104, a reference light beam splitter 105, a delay adjustor 106, a first optical circulator 121, a second optical circulator 122, a first optical system 131, a second optical system 132, a first optical interferometer 151, a second optical interferometer 152, a first photoelectric convertor 161, a second photoelectric convertor 162, a first digital convertor 171, a second digital convertor 172, a frequency meter 181, a distance calculator 182, and an information transmitter 190.

The laser light source 101 emits a laser beam that is continuous light. In the first embodiment, the laser light source 101 is a light source that emits a laser beam having a predetermined frequency, such as a gas laser or a semiconductor laser.

The laser light source 101 is not an essential component in the optical distance measurer 100 according to the first embodiment. For example, the optical distance measurer 100 may operate by receiving a laser beam emitted from an external laser beam generating device including the laser light source 101.

The laser beam emitted from the laser light source 101 is input to the wavelength sweeper 102. The wavelength sweeper 102 sweeps the wavelength of the laser beam input thereto and outputs the laser beam that has been swept as sweep light. The sweep light output from the wavelength sweeper 102 is a laser beam of a continuous wave.

The beam splitter 103 includes an optical coupler or the like, splits the laser beam of a continuous wave that has been input thereto, and outputs the split laser beam as measurement light and reference light. More specifically, the beam splitter 103 splits the sweep light, which is the laser beam emitted from the wavelength sweeper 102, and outputs laser beams that have been split as the measurement light and the reference light.

The measurement light beam splitter 104 splits the measurement light output from the beam splitter 103 and outputs the split rays of measurement light as first measurement light and second measurement light. Specifically, the measurement light beam splitter 104 includes a polarizing beam splitter (PBS) or the like, and the measurement light beam splitter 104 splits the measurement light output from the beam splitter 103 by polarization separation and outputs the split rays of measurement light as first polarization measurement light which is the first measurement light and second polarization measurement light which is the second measurement light. The first polarization measurement light and the second polarization measurement light are, for example, linearly polarized light beams having mutually different vibration directions.

The first optical circulator 121 includes, for example, a three-port optical circulator and guides the first measurement light output from the measurement light beam splitter 104 to the first optical system 131. Specifically, the first optical circulator 121 guides the first polarization measurement light, which is the first measurement light output from the measurement light beam splitter 104, to the first optical system 131.

The first optical system 131 emits the first measurement light to a target object 20. Specifically, for example, the first optical system 131 includes lenses such as one or more transmission lenses or one or more reflection lenses, and the first optical system 131 expands the light flux diameter of the first polarization measurement light guided to the first optical system 131 by the first optical circulator 121 and emits the first polarization measurement light, the light flux diameter of which is expanded, to the target object 20.

The first optical system 131 has a first Rayleigh length. Note that the Rayleigh length is one of values indicating a condensing characteristic of an optical system in a laser beam, and is a value indicating a range of a length in a direction from the optical system toward the focal point in which the diameter of the laser beam condensed by the optical system can be deemed to be sufficiently small.

The first optical system 131 guides, to the first optical circulator 121, first reflection light that is the first polarization measurement light emitted to the target object 20 and reflected by the target object 20.

The first optical circulator 121 guides the first reflection light to the first optical interferometer 151.

The second optical circulator 122 includes, for example, a three-port optical circulator and guides the second measurement light output from the measurement light beam splitter 104 to the second optical system 132. Specifically, the second optical circulator 122 guides the second polarization measurement light, which is the second measurement light output from the measurement light beam splitter 104, to the second optical system 132.

The second optical system 132 emits the second measurement light to the target object 20. Specifically, for example, the second optical system 132 includes lenses such as one or more transmission lenses or one or more reflection lenses, and the second optical system 132 expands the light flux diameter of the second polarization measurement light guided to the second optical system 132 by the second optical circulator 122 and emits the second polarization measurement light, the light flux diameter of which is expanded, to the target object 20.

The second optical system 132 has a second Rayleigh length that is different from the first Rayleigh length.

The second optical system 132 has a focal length equal to the focal length of the first optical system 131. Note that equal focal lengths are not limited to exactly equal focal lengths and includes substantially equal focal lengths.

The second optical system 132 guides, to the second optical circulator 122, second reflection light that is the second polarization measurement light emitted to the target object 20 and reflected by the target object 20.

The second optical circulator 122 guides the second reflection light to the second optical interferometer 152.

The reference light beam splitter 105 splits the reference light output from the beam splitter 103 and outputs the split rays of reference light as first reference light and second reference light. Specifically, the reference light beam splitter 105 includes a PBS or the like, and the reference light beam splitter 105 splits the reference light output from the beam splitter 103 by polarization separation and outputs the split rays of reference light as first polarization reference light which is the first reference light and second polarization reference light which is the second reference light. The first polarization reference light and the second polarization reference light are, for example, linearly polarized light beams having mutually different vibration directions.

In the following description, it is assumed that the vibration direction of the first polarization measurement light and the vibration direction of the first polarization reference light are the same, and the vibration direction of the second polarization measurement light and the vibration direction of the second polarization reference light are the same.

The first reference light output from the reference light beam splitter 105 is guided to the first optical interferometer 151.

The second reference light output from the reference light beam splitter 105 is guided to the second optical interferometer 152.

The delay adjustor 106 adjusts a path difference between the measurement light and the reference light output from the beam splitter 103.

In the optical distance measurer 100 according to the first embodiment, a transmitter 110 includes the laser light source 101, the wavelength sweeper 102, the beam splitter 103, the measurement light beam splitter 104, the reference light beam splitter 105, the delay adjustor 106, the first optical circulator 121, the second optical circulator 122, the first optical system 131, and the second optical system 132.

The first optical interferometer 151 interferes the first reference light and the first reflection light into an interference light and outputs the interference light as first interference light. Specifically, the first optical interferometer 151 includes, for example, a 90-degree optical hybrid and outputs the first interference light by combining the first reference light and the first reflection light.

The first photoelectric convertor 161 photoelectrically converts the first interference light into an analog signal and outputs the analog signal as a first analog signal, where the first analog signal has information on the first interference light.

The first digital convertor 171 A/D converts the first analog signal into a digital signal and outputs the digital signal as a first receiving signal.

In the optical distance measurer 100 according to the first embodiment, a first receiver 141 includes the first optical interferometer 151, the first photoelectric convertor 161, and the first digital convertor 171.

In other words, the first receiver 141 receives the first reference light and the first reflection light and outputs a first receiving signal having information on both the first reference light and the first reflection light, where the first reflection light is a reflected light reflected at the target object 20 and is originally the first measurement light.

The second optical interferometer 152 interferes the second reference light and the second reflection light into another interference light and outputs the other interference light as second interference light. Specifically, the second optical interferometer 152 includes, for example, a 90-degree optical hybrid and outputs the second interference light by combining the second reference light and the second reflection light.

The second photoelectric convertor 162 photoelectrically converts the second interference light into another analog signal and outputs the other analog signal as a second analog signal having information on the second interference light.

The second digital convertor 172 A/D converts the second analog signal into another digital signal and outputs the other digital signal as a second receiving signal.

In the optical distance measurer 100 according to the first embodiment, a second receiver 142 includes the second optical interferometer 152, the second photoelectric convertor 162, and the second digital convertor 172.

In other words, the second receiver 142 receives the second reference light and the second reflection light and outputs the second receiving signal having information on both the second reference light and the second reflection light, the second reflection light being another reflected light reflected at the target object 20 and originally being the second measurement light.

The frequency meter 181, for each frequency component, measures the intensity of the first reference light and the first reflection light by referring to the first receiving signal. In addition, for each frequency component, the frequency meter 181 outputs first signal information having information on the intensity of the first reference light and the first reflection light.

The frequency meter 181, for each frequency component, also measures the intensity of the second reference light and the second reflection light by referring to the second receiving signal. In addition, for each frequency component, the frequency meter 181 outputs second signal information having information on the intensity of the second reference light and the second reflection light.

More specifically, for example, the frequency meter 181 measures the intensity of the first reference light and the first reflection light for each frequency component by performing Fourier transform on the first receiving signal. In addition, the frequency meter 181 measures the intensity of the second reference light and the second reflection light for each frequency component by performing Fourier transform on the second receiving signal.

The distance calculator 182 calculates the distance from the transmitter 110 to the target object 20 by referring to either the first signal information or the second signal information output from the frequency meter 181. Furthermore, the distance calculator 182 outputs distance information indicating the distance from the transmitter 110 to the target object 20 calculated by the distance calculator 182. The distance from the transmitter 110 to the target object 20 is, for example, a distance from the first optical system 131 or the second optical system 132 to the target object 20. The distance from the transmitter 110 to the target object 20 is not limited to the distance from the first optical system 131 or the second optical system 132 to the target object 20 and may be a distance from a component, which serves as a reference in the transmitter 110, to the target object 20.

Specifically, for example, the distance calculator 182 calculates the distance from the transmitter 110 to the target object 20 by referring to the first signal information or the second signal information output from the frequency meter 181 by a polarization diversity method. Furthermore, the distance calculator 182 outputs distance information indicating the distance from the transmitter 110 to the target object 20 calculated by the distance calculator 182.

The distance calculator 182 may calculate the distance from the transmitter 110 to the target object 20 by referring to the first signal information and the second signal information output from the frequency meter 181.

The distance from the transmitter 110 to the target object 20 calculated by the distance calculator 182 is, for example, the distance from the first optical circulator 121, the second optical circulator 122, the first optical system 131, or the second optical system 132 to the target object 20.

The delay adjustor 106 adjusts a difference between the path length of the measurement light and the path length of the reference light. For example, in a case where the distance from the transmitter 110 to the target object 20 calculated by the distance calculator 182 is defined to be the distance from the first optical circulator 121 to the target object 20, each of the path lengths is as follows. The measurement light path length is a sum of a length starting from the beam splitter 103 via the measurement light beam splitter 104 via the first optical circulator 121 to the first optical system 131 and a length from the first optical circulator 121 to the first optical interferometer 151. The reference light path length is a length starting from the beam splitter 103 to the first optical interferometer 151.

The information transmitter 190 performs control for transmitting distance information indicating the distance between the transmitter 110 and the target object 20 output by the distance calculator 182 to the outside.

Note that connections between the laser light source 101 and the wavelength sweeper 102, between the wavelength sweeper 102 and the beam splitter 103, between the beam splitter 103 and the measurement light beam splitter 104, between the beam splitter 103 and the delay adjustor 106, and between the delay adjustor 106 and the measurement light beam splitter 104 are made by, for example, optical fibers, and a laser beam is guided via the optical fibers. Meanwhile, connections between the measurement light beam splitter 104 and the first optical circulator 121, between the first optical circulator 121 and the first optical interferometer 151, between the measurement light beam splitter 104 and the second optical circulator 122, between the second optical circulator 122 and the second optical interferometer 152, between the measurement light beam splitter 104 and the first optical interferometer 151, and between the measurement light beam splitter 104 and the second optical interferometer 152 are made by, for example, optical fibers that are polarization-maintaining fibers that maintain the amplitude direction of a polarized wave, and a laser beam that is polarized light is guided via the optical fibers.

An application example of the optical distance measurer 100 according to the first embodiment will be described by referring to FIGS. 2 and 3.

Figure 2:
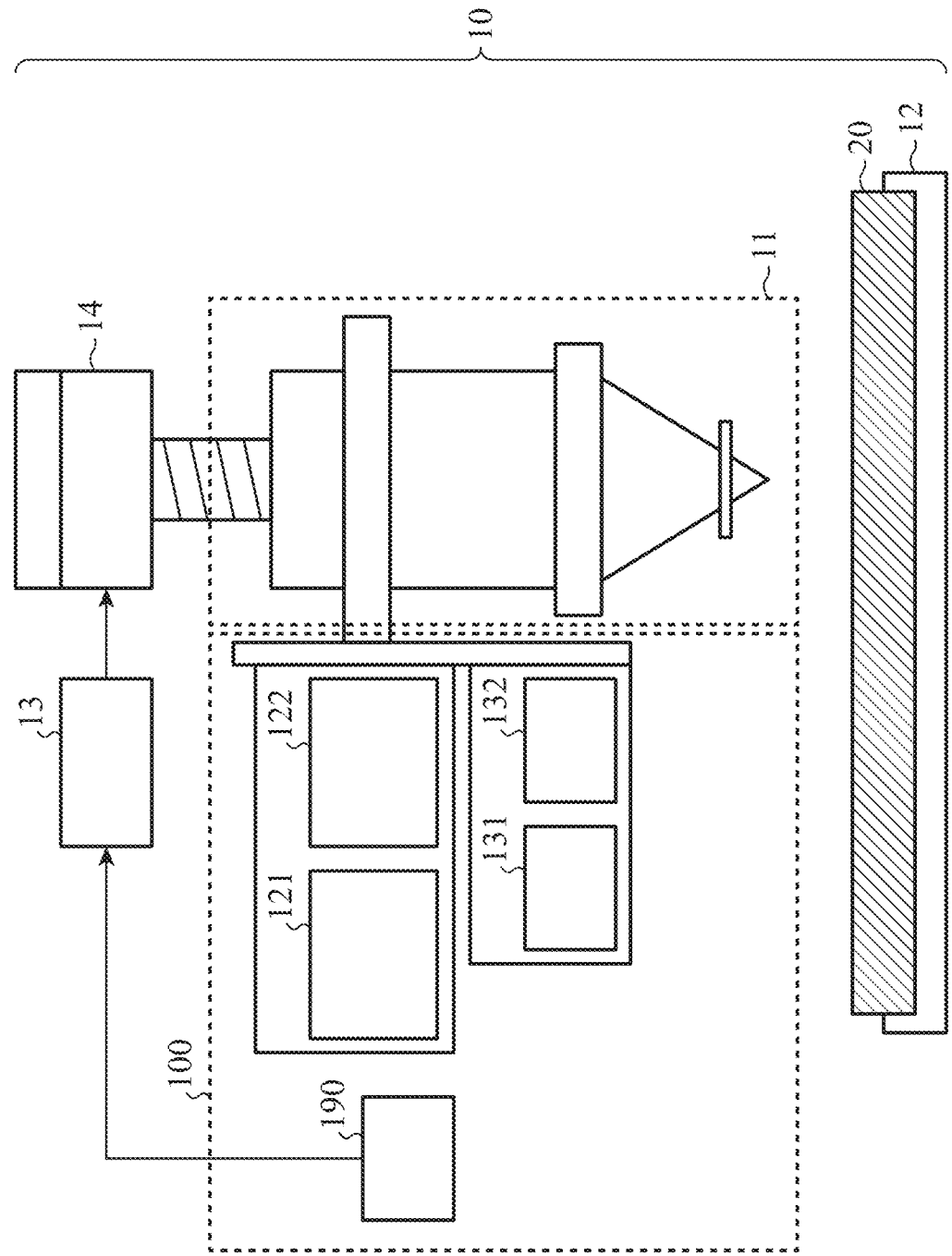
FIG. 2 is a diagram illustrating an example of a machining apparatus to which the optical distance measurer according to the first embodiment is applied.
Figure 3:
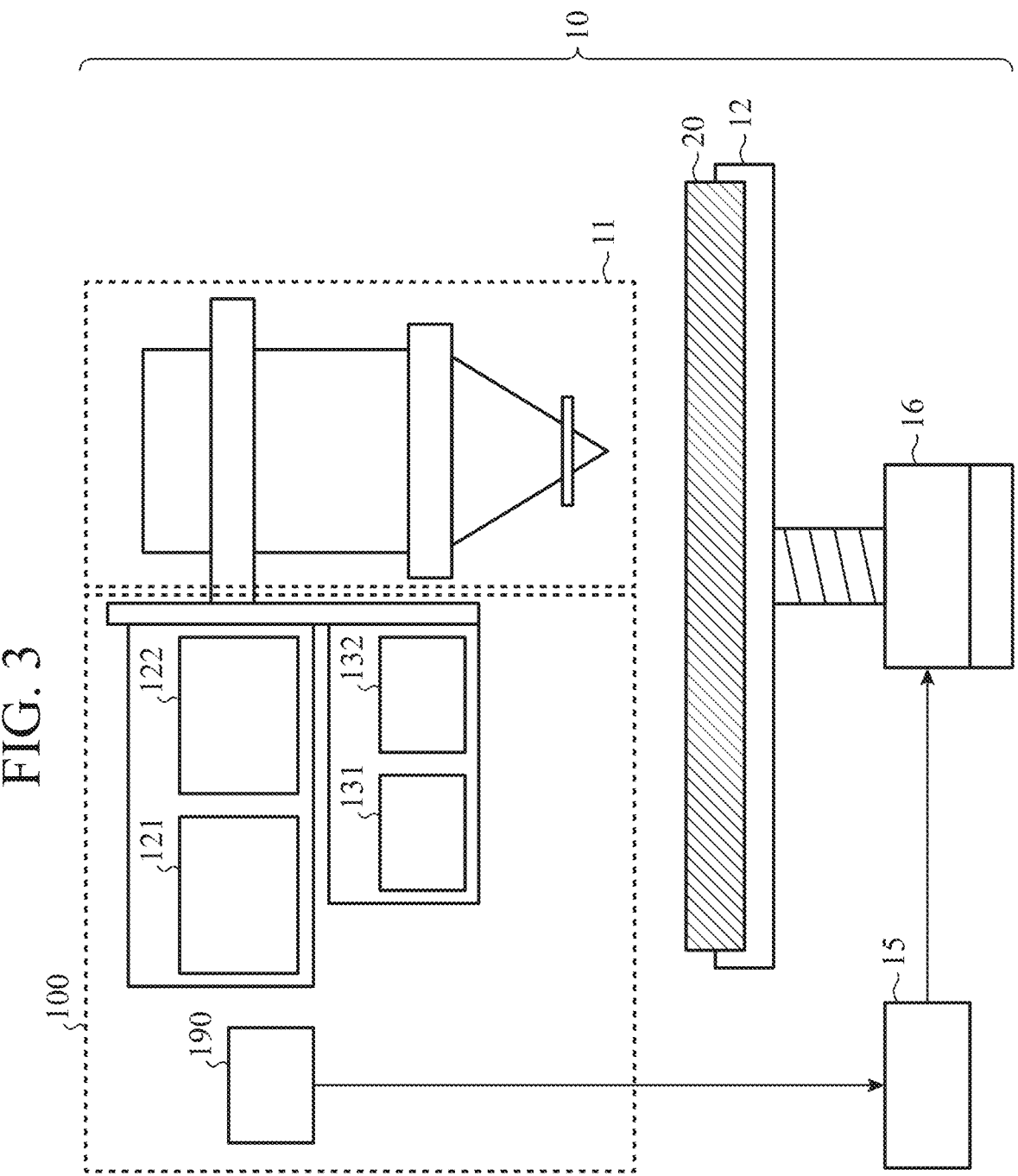
FIG. 3 is a diagram illustrating an example of a machining apparatus to which the optical distance measurer according to the first embodiment is applied.

FIGS. 2 and 3 are diagrams each illustrating an example of a machining apparatus 10 to which the optical distance measurer 100 according to the first embodiment is applied.

The machining apparatus 10 illustrated in FIG. 2 includes a chuck 12, a machining head 11, a machining head movement controller 13, and a machining head moving mechanism 14.

A target object 20 is an object to be machined by the machining apparatus 10.

The chuck 12 is a pedestal for securing the target object 20.

The machining head 11 is a part for machining the target object 20. The machining head 11 may perform machining in contact with the target object 20 or may perform machining on the target object 20 in a contactless manner when processing the target object 20.

The machining head movement controller 13 acquires distance information output from the optical distance measurer 100 and generates a control signal for moving the machining head 11 with respect to the chuck 12 by referring to the distance information. The machining head movement controller 13 outputs the control signal that has been generated to the machining head moving mechanism 14.

The machining head moving mechanism 14 receives the control signal output from the machining head movement controller 13 and moves the machining head 11 with respect to the chuck 12 by referring to the control signal.

A machining apparatus 10 illustrated in FIG. 3 includes a chuck 12, a machining head 11, a chuck movement controller 15, and a chuck moving mechanism 16.

Since the chuck 12 and the machining head 11 are similar to the chuck 12 and the machining head 11 illustrated in FIG. 2, the description thereof is omitted.

The chuck movement controller 15 acquires distance information output from the optical distance measurer 100 and generates a control signal for moving the chuck 12 with respect to the machining head 11 by referring to the distance information. The chuck movement controller 15 outputs the control signal that has been generated to the chuck moving mechanism 16.

The chuck moving mechanism 16 receives the control signal output from the chuck movement controller 15 and moves the chuck 12 with respect to the machining head 11 by referring to the control signal.

In FIGS. 2 and 3, the first optical circulator 121, the second optical circulator 122, the first optical system 131, and the second optical system 132 in the optical distance measurer 100 are secured to the machining head 11. It is assumed that the positions at which the first optical circulator 121, the second optical circulator 122, the first optical system 131, and the second optical system 132 are secured to the machining head 11 are known. That is, the machining head movement controller 13 or the chuck movement controller 15 can calculate the distance between the machining head 11 and the target object 20 by referring to the distance from the transmitter 110 to the target object 20 indicated by the distance information output by the optical distance measurer 100.

By referring to FIG. 4, description will be given on a method in which the distance calculator 182 according to the first embodiment calculates the distance from the transmitter 110 to the target object 20.

Figure 4A:
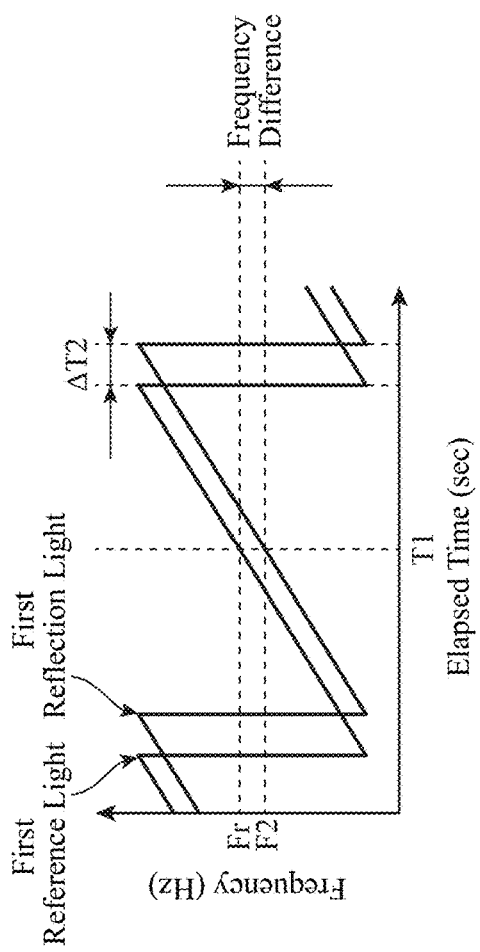
FIG. 4A is a diagram illustrating an example of distances between a transmitter according to the first embodiment and target objects.

FIG. 4A is a diagram illustrating an example of distances between the transmitter 110 according to the first embodiment and the target object 20.

FIG. 4A is a diagram illustrating, as an example, that the target object 20 is at a position separated by X1, X2, and X3 from the transmitter 110 according to the first embodiment.

Figure 4B:
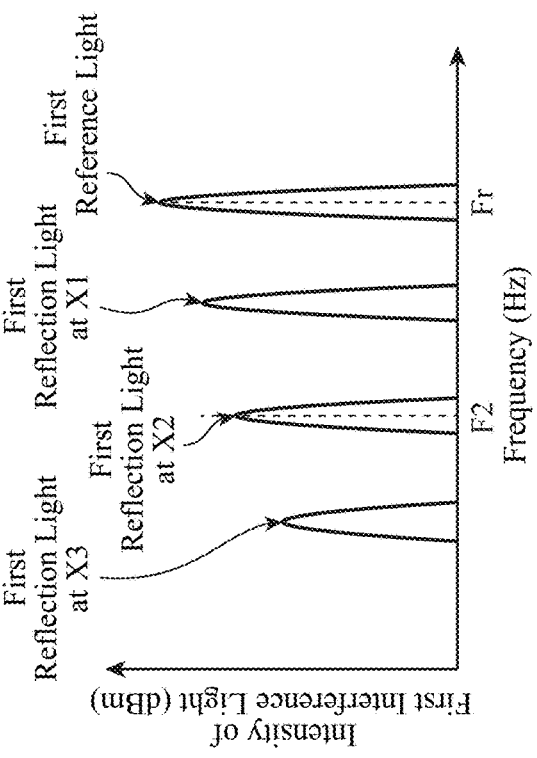
FIG. 4B is a graph illustrating an example of the relationship between first reference light and first reflection light input to a first optical interferometer in a case where the distance between the transmitter according to the first embodiment and a target object is X2.

FIG. 4B is a graph illustrating an example of the relationship between the first reference light and the first reflection light input to the first optical interferometer 151 in a case where the distance between the transmitter 110 according to the first embodiment and the target object 20 is X2. In FIG. 4B, the horizontal axis represents the elapsed time, and the vertical axis represents the frequency.

Since the laser beam input to the beam splitter 103 is sweep light, the reference light, and the measurement light output from the beam splitter 103 and the reflection light, which is the measurement light reflected by the target object 20, are sweep light. That is, the frequencies of the first reference light and the first reflection light input to the first optical interferometer 151 change as time elapses, similarly to the sweep light. In the first embodiment, it is assumed that the value of the frequency change per unit time in the sweep light is known.

In the first optical interferometer 151, the first reflection light is delayed with respect to the first reference light depending on the distance between the transmitter 110 and the target object 20. Therefore, in FIG. 4B, the first reflection light is illustrated in a state of being shifted to the right by time ΔT2 with respect to the first reference light.

The frequency meter 181 measures the intensity of the first interference light for each frequency component by referring to the first interference light at a certain time point T1.

Figure 4C:
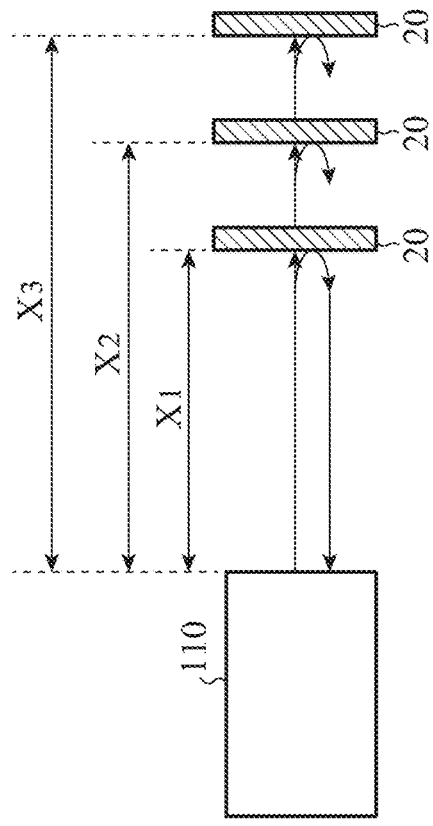
FIG. 4C is a graph illustrating the frequency spectrum of the first interference light measured by a frequency meter by referring to a first receiving signal at a certain time point T1 illustrated in FIG. 4B.

FIG. 4C is a graph illustrating the frequency spectrum of the first interference light measured by the frequency meter 181 by referring to a first receiving signal at a certain time point T1 illustrated in FIG. 4B. In FIG. 4C, the horizontal axis represents the frequency, and the vertical axis represents the intensity of the first interference light.

In FIG. 4C, the intensity of the first interference light is increased in two frequency bands. In FIG. 4C, out of the two frequency bands in which the intensity of the first interference light is high, the light having a high frequency of Fr is the first reference light, and the light having a low frequency of F2 is the first reflection light.

The frequency meter 181 generates first signal information indicating that the frequency of the first reference light is Fr and that the frequency of the first reflection light is F2 and outputs the first signal information.

The distance calculator 182 calculates time ΔT2 that is a delay of the first reflection light with respect to the first reference light by referring to the first signal information output from the frequency meter 181 and a known value of a frequency change per unit time in the sweep light.

The distance calculator 182 calculates X2, which is the distance from the transmitter 110 to the target object 20, by multiplying the calculated time ΔT2 by the known speed of light speed further multiplying by ½.

Figure 4D:
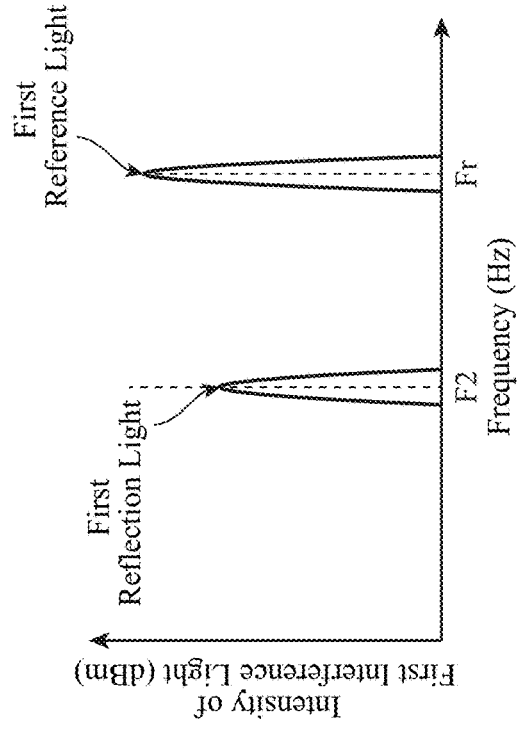
FIG. 4D is a graph illustrating the frequency spectrum of the first interference light measured by a frequency meter by referring to a first receiving signal at a certain time point with the positions of the target objects illustrated in FIG. 4A.

FIG. 4D is a graph illustrating the frequency spectrum of the first interference light measured by the frequency meter 181 by referring to a first receiving signal at a certain time point with the positions of the target object 20 illustrated in FIG. 4A.

For example, in a case where the distance between the transmitter 110 and the target object 20 is X1 that is shorter than X2 as illustrated in FIG. 4A, the difference between the frequency of the first reference light and the frequency of the first reflection light is small as illustrated in FIG. 4D. In this case, the time of delay of the first reflection light with respect to the first reference light, which is calculated by the distance calculator 182, is shorter than the time ΔT2 at which the distance between the transmitter 110 and the target object 20 is X2.

Furthermore, for example, in a case where the distance between the transmitter 110 and the target object 20 is X3 that is longer than X2 as illustrated in FIG. 4A, the difference between the frequency of the first reference light and the frequency of the first reflection light is large as illustrated in FIG. 4D. In this case, the time of delay of the first reflection light with respect to the first reference light, which is calculated by the distance calculator 182, is longer than the time ΔT2 at which the distance between the transmitter 110 and the target object 20 is X2.

Note that the method to calculate the distance from the transmitter 110 to the target object 20 by the distance calculator 182 according to the first embodiment has been described above with the example of the first reference light and the first reflection light input to the first optical interferometer 151; however, the method for the distance calculator 182 to calculate the distance from the transmitter 110 to the target object 20 is similar also for the second reference light and the second reflection light input to the second optical interferometer 152, and thus description thereof is omitted.

The distance at which the distance calculator 182 can calculate the distance from the transmitter 110 to the target object 20 is in the vicinity of the focal length including the focal lengths of the first optical system 131 and the second optical system 132. As described above, the first optical system 131 and the second optical system 132 have the same focal length.

A range in which the distance calculator 182 can calculate the distance from the transmitter 110 to the target object 20 when the first optical system 131 or the second optical system 132 are used will be described by referring to FIG. 5.

Hereinafter, as an example, description will be given on the assumption that the second Rayleigh length of the second optical system 132 is longer than the first Rayleigh length of the first optical system 131.

Figure 5A:
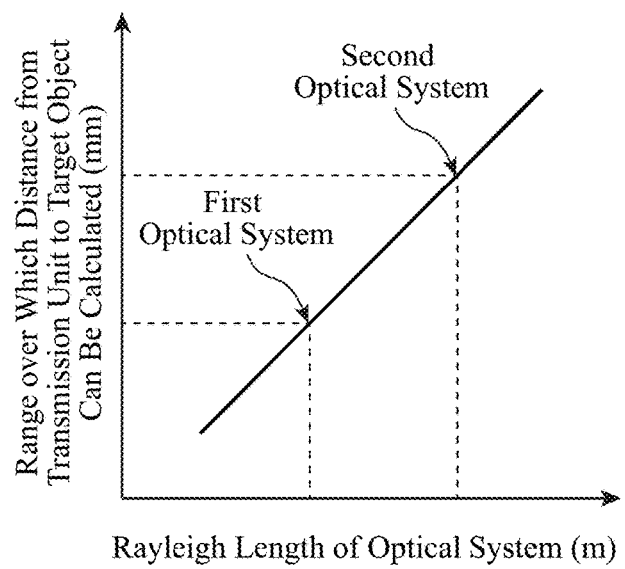
FIG. 5A is a graph illustrating an example of the relationship between the Rayleigh length of optical systems and the range in which a distance calculator according to the first embodiment can calculate a distance from the transmitter to a target object.

FIG. 5A is a graph illustrating an example of the relationship between the Rayleigh length of optical systems and the range in which the distance calculator 182 can calculate a distance from the transmitter 110 to the target object 20.

As illustrated in FIG. 5A, the range over which the distance calculator 182 can calculate the distance from the transmitter 110 to the target object 20 expands as the Rayleigh length of the optical system becomes longer.

That is, since the second Rayleigh length of the second optical system 132 is longer than the first Rayleigh length of the first optical system 131, the range of the distance from the transmitter 110 to the target object 20 that can be calculated by the distance calculator 182 by referring to the second receiving signal output from the second receiver 142 is wider than the range of the distance from the transmitter 110 to the target object 20 that can be calculated by referring to the first receiving signal output from the first receiver 141.

Figure 5B:
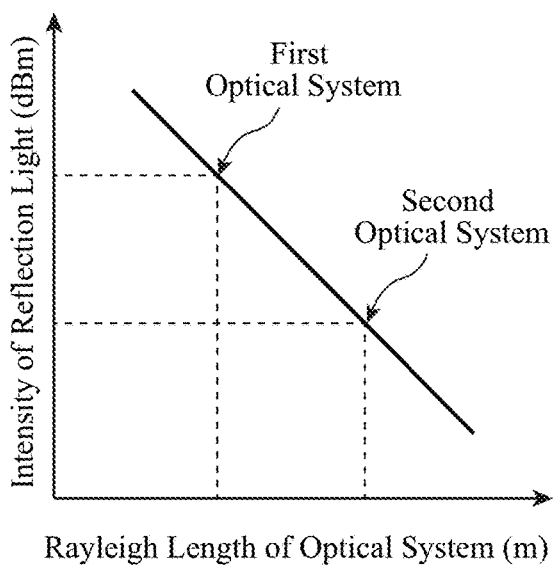
FIG. 5B is a diagram illustrating an example of the relationship between the Rayleigh length of the optical systems and the intensity of reflection waves in a case where the distance from the transmitter according to the first embodiment to a target object is constant.

FIG. 5B is a diagram illustrating an example of the relationship between the Rayleigh length of an optical system and the intensity of a reflection wave in a case where the distance from the transmitter 110 to the target object 20 is constant.

The longer the Rayleigh length is, the smaller the spot diameter is. In general, since the target object 20 has surface roughness on the surface, reflection light of the measurement light reflected by the target object 20 has not only a regular reflection component but also irregular reflection components. Therefore, the reflection light returning to the optical system attenuates as the ratio of irregular reflection components increases. The attenuation amount of reflection light increases as the spot diameter increases and decreases as the spot diameter decreases. That is, the intensity of the reflection wave is weaker as the Rayleigh length is longer and stronger as the Rayleigh length is shorter.

As shown in FIG. 5B, it can be seen that in a case where the distance from the transmitter 110 to the target object 20 is constant, the intensity of a reflection wave becomes weaker as the Rayleigh length of an optical system becomes longer.

That is, since the second Rayleigh length of the second optical system 132 is longer than the first Rayleigh length of the first optical system 131, the intensity of the second reflection wave included in the second receiving signal output from the second receiver 142 is weaker than the intensity of the first reflection wave included in the first receiving signal output from the first receiver 141.

Figure 5C:
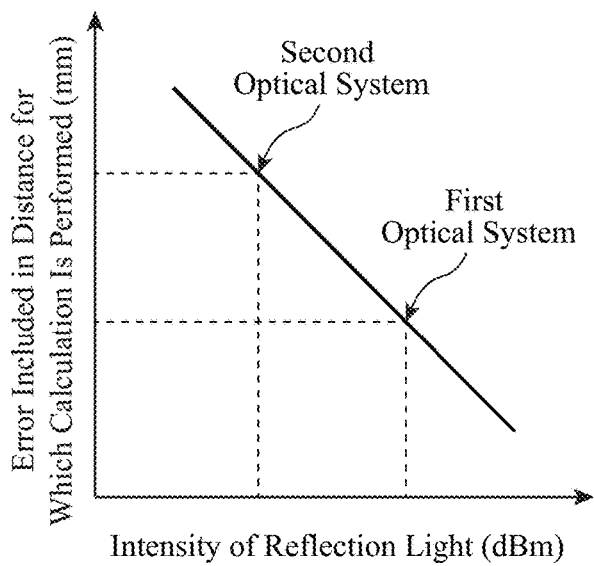
FIG. 5C is a graph illustrating an example of the relationship between the intensity of a reflection wave and an error included in the distance from the transmitter to a target object calculated by the distance calculator according to the first embodiment.

FIG. 5C is a graph illustrating an example of the relationship between the intensity of a reflection wave and an error included in the distance from the transmitter 110 to the target object 20 calculated by the distance calculator 182.

As shown in FIG. 5C, it can be seen that in a case where the distance from the transmitter 110 to the target object 20 is constant, the error included in the distance from the transmitter 110 to the target object 20 calculated by the distance calculator 182 decreases as the intensity of the reflection wave increases.

That is, since the intensity of the second reflection wave included in the second receiving signal output by the second receiver 142 is weaker than the intensity of the first reflection wave included in the first receiving signal output by the first receiver 141, the error included in the distance from the transmitter 110 to the target object 20 calculated by the distance calculator 182 by referring to the second receiving signal output by the second receiver 142 is larger than the error included in the distance from the transmitter 110 to the target object 20 calculated by referring to the first receiving signal output by the first receiver 141.

As described above, in a case where the distance from the transmitter 110 to the target object 20 is measured using the first optical system 131, the measurement range is narrower than that in a case where the distance from the transmitter 110 to the target object 20 is measured using the second optical system 132, but the measurement error is small.

For example, first, as a first step, the optical distance measurer 100 measures a rough distance from the transmitter 110 to the target object 20 by referring to the second receiving signal output from the second receiver 142 for the target object 20 whose distance from the transmitter 110 is unknown.

Next, as a second step, the machining apparatus 10 moves the machining head 11 or the chuck 12 by referring to distance information indicating the rough distance from the transmitter 110 to the target object 20 that has been acquired from the optical distance measurer 100 to perform rough position alignment.

Next, as a third step, the optical distance measurer 100 calculates an accurate distance from the transmitter 110 to the target object 20 by referring to the first receiving signal output from the first receiver 141.

By referring to FIG. 6, the effect of the optical distance measurer 100 measuring the distance from the transmitter 110 to the target object 20 using the first polarization measurement light and the second polarization measurement light as well as the first polarization reference light and the second polarization reference light will be described.

Figure 6:
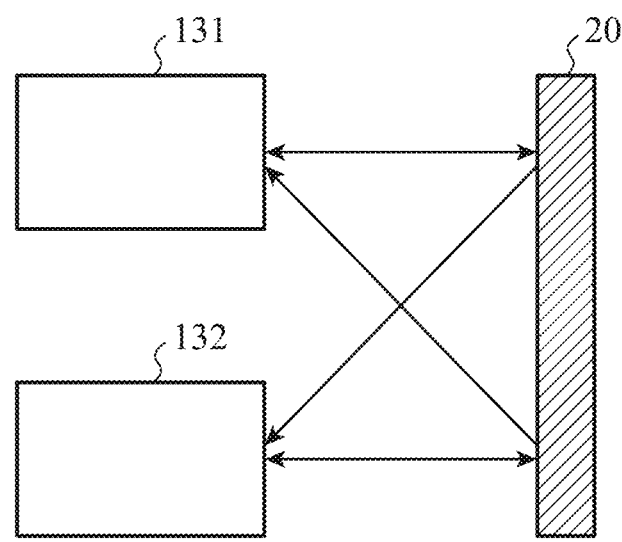
FIG. 6 is a diagram illustrating an example of paths of first measurement light and second measurement light according to the first embodiment as well as first reflection light and second reflection light that are the first measurement light and the second measurement light reflected by a target object, respectively.

FIG. 6 is a diagram illustrating an example of paths of the first measurement light and the second measurement light as well as the first reflection light and the second reflection light that are the first measurement light and the second measurement light reflected by the target object 20, respectively.

The surface of the target object 20 emitted with the first measurement light and the second measurement light has surface roughness.

Therefore, as illustrated in FIG. 6, the first reflection light and the second reflection light that are the first measurement light and the second measurement light reflected by the surface include not only a regular reflection component reflected toward the same paths as those of the first measurement light and the second measurement light but also irregular reflection components reflected while uniformly spreading to a wide angle. Therefore, the reflection light incident on the first optical system 131 has a component resulting from the first reflection light and a component resulting from stray light of the second reflection light irregularly reflected by the surface. Likewise, the reflection light incident on the second optical system 132 has a component resulting from the second reflection light and a component resulting from stray light of the first reflection light irregularly reflected by the surface.

Meanwhile, as described above, the optical distance measurer 100 according to the first embodiment measures the distance from the transmitter 110 to the target object 20 using the first polarization measurement light and the second polarization measurement light split by the polarization separation of the measurement light by the measurement light beam splitter 104 and the first polarization reference light and the second polarization reference light split by the polarization separation of the reference light by the reference light beam splitter 105.

Two polarized waves having different vibration directions do not interfere with each other. Therefore, the component resulting from stray light of the second reflection light incident on the first optical system 131 irregularly reflected by the surface does not interfere with the component resulting from the first reflection light in the first optical interferometer 151. Therefore, the frequency meter 181 can accurately measure the frequency of the first measurement light in the first receiving signal by referring to the component resulting from the first reflection light. Similarly, the component resulting from the stray light of the first reflection light incident on the second optical system 132 irregularly reflected on the surface does not interfere with the component resulting from the second reflection light in the second optical interferometer 152. Therefore, the frequency meter 181 can accurately measure the frequency of the second measurement light in the second receiving signal by referring to the component resulting from the second reflection light.

In the third step, when the optical distance measurer 100 measures the distance from the transmitter 110 to the target object 20, an accurate distance from the transmitter 110 to the target object 20 may be calculated by referring to the first receiving signal output from the first receiver 141 and the second receiving signal output from the second receiver 142.

More specifically, for example, the frequency meter 181, by referring to a composite signal of the first receiving signal and the second receiving signal, for each frequency component, may measure the intensities of the first reference light and the first reflection light and output the first signal information having information on the intensities of the first reference light and the first reflection light. The distance calculator 182 calculates the distance from the transmitter 110 to the target object 20 by referring to the first signal information output from the frequency meter 181.

With this configuration, in the third step, the optical distance measurer 100 can more accurately calculate the distance from the transmitter 110 to the target object 20.

Furthermore, for example, in the third step, the frequency meter 181 may measure the intensities of the first reference light and the first reflection light for each frequency component by referring to the first receiving signal or the second receiving signal by a polarization diversity method and output the first signal information indicating the intensities of the first reference light and the first reflection light, which have been measured, for each frequency component.

For example, the polarization ratio between the first polarization measurement light and the second polarization measurement light fluctuates depending on the environmental temperature in the optical distance measurer 100, the disturbance generated during propagation in the optical fibers, the material of the target object 20, the state of the surface of the target object 20, etc. In a case where the frequency meter 181 measures the frequency using only the first receiving signal generated by only one of the polarized waves, there are cases where the reception sensitivity of the first reflection wave in the first receiver 141 is deteriorated when the polarization ratio fluctuates since the two polarized waves having different vibration directions do not interfere with each other.

On the other hand, since the sum of the intensities of the two polarized waves is constant, even if the intensity of one of the polarized waves decreases, the intensity of the other polarized wave increases by the amount of the decrease.

Therefore, the frequency meter 181 measures the intensities of the first reference light and the first reflection light for each frequency component by referring to the first receiving signal or the second receiving signal each generated by the two polarized waves by a polarization diversity method and outputs the first signal information indicating the intensities of the first reference light and the first reflection light, which have been measured, for each frequency component.

With this configuration, in the third step, the optical distance measurer 100 becomes resistant against fluctuations in the polarization ratio between the first polarization measurement light and the second polarization measurement light, and hence can more accurately calculate the distance from the transmitter 110 to the target object 20 in spite of the fluctuation of the polarization ratio.

As described above, the optical distance measurer 100 includes the transmitter 110, the first receiver 141, and the second receiver 142, the transmitter 110 comprising: the beam splitter 103 splitting a laser beam into measurement light and reference light and outputting the measurement light and the reference light, the laser beam the input of the beam splitter 103 being a continuous wave; the measurement light beam splitter 104 splitting the measurement light into first measurement light and second measurement light and outputting the first measurement light and the second measurement light; the reference light beam splitter 105 splitting the reference light into first reference light and second reference light and outputting the first reference light and the second reference light; the first optical system 131 having a first Rayleigh length, the first optical system 131 emitting the first measurement light to a target object 20; and the second optical system 132 having a second Rayleigh length different from the first Rayleigh length and a focal length equal to the focal length of the first optical system 131, the second optical system 132 emitting the second measurement light to the target object 20; the first receiver 141 receives the first reference light and first reflection light and outputs a first receiving signal having information on both the first reference light and the first reflection light, the first reflection light being a reflected light reflected at the target object 20 and originally being the first measurement light; and the second receiver 142 receives the second reference light and second reflection light and outputs the second receiving signal having information on both the second reference light and the second reflection light, the second reflection light being another reflected light reflected at the target object 20 and originally being the second measurement light.

With this configuration, the optical distance measurer 100 can measure the distance from the transmitter 110 to the target object 20 with high accuracy while broadening the distance measurement range.

Moreover, in addition to the configuration described above, the optical distance measurer 100 further includes: the frequency meter 181, for each frequency component, measuring intensities of the first reference light and the first reflection light by referring to the first receiving signal and outputting the first signal information having information on the intensities of the first reference light and the first reflection light, also, for each frequency component, measuring intensities of the second reference light and the second reflection light by referring to the second receiving signal and outputting second signal information having information on the intensities of the second reference light and the second reflection light; and the distance calculator 182 calculating the distance from the transmitter 110 to the target object 20 by referring to either the first signal information or the second signal information and outputting distance information having information on the distance from the transmitter 110 to the target object 20.

With this configuration, the optical distance measurer 100 can measure the distance from the transmitter 110 to the target object 20 with high accuracy while broadening the distance measurement range.

Furthermore, the frequency meter 181 measures the intensities of the first reference light and the first reflection light for each frequency component by referring to a signal obtained by combining the first receiving signal and the second receiving signal and outputs the first signal information indicating the intensities of the first reference light and the first reflection light, which have been measured, for each frequency component.

With this configuration, the optical distance measurer 100 can measure the distance from the transmitter 110 to the target object 20 with even higher accuracy.

Furthermore, in the configuration described above, the optical distance measurer 100 is configured such that the measurement light beam splitter 104 splits the measurement light output from the beam splitter 103 by polarization separation and outputs the measurement light that has been split as first polarization measurement light that is the first measurement light and second polarization measurement light that is the second measurement light, and the reference light beam splitter 105 splits the reference light output from the beam splitter 103 by polarization separation and outputs the reference light that has been split as first polarization reference light that is the first reference light and second polarization reference light that is the second reference light.

With this configuration, the optical distance measurer 100 can measure the distance from the transmitter 110 to the target object 20 with even higher accuracy while broadening the distance measurement range.

Furthermore, in the configuration described above, the optical distance measurer 100 is configured such that the frequency meter 181 measures the intensities of the first reference light and the first reflection light for each frequency component on a basis of the first receiving signal or the second receiving signal by a polarization diversity method and outputs the first signal information indicating the intensities of the first reference light and the first reflection light, which have been measured, for each frequency component.

With this configuration, the optical distance measurer 100 becomes resistant against fluctuations in the polarization ratio between the first polarization measurement light and the second polarization measurement light, and hence can measure the distance from the transmitter 110 to the target object 20 with even higher accuracy in spite of the fluctuation of the polarization ratio.

In addition, in the configuration described above, the optical distance measurer 100 can be configured such that the transmitter 110 further includes: the wavelength sweeper 102 wavelength-sweeping the laser beam and outputting the laser beam as a sweep light, the beam splitter 103 splits the sweep light into two beams of light and outputs the two beams of light as the measurement light and the reference light, wherein the first receiver 141 includes: the first optical interferometer 151 interfering the first reference light and the first reflection light into an interference light and outputting the interference light as first interference light; the first photoelectric convertor 161 photoelectrically converting the first interference light into an analog signal and outputting the analog signal as first analog signal; and the first digital convertor 171 A/D converting the first analog signal into a digital signal and outputting the digital signal as the first receiving signal, and wherein the second receiver 142 includes: the second optical interferometer 152 interfering the second reference light and the second reflection light into another interference light and outputting the other interference light as second interference light; the second photoelectric convertor 162 photoelectrically converting the second interference light into another analog signal and outputting the other analog signal as second analog signal; and the second digital convertor 172 A/D converting the second analog signal into another digital signal and outputting the other digital signal as the second receiving signal.

With this configuration, the optical distance measurer 100 can measure the distance from the transmitter 110 to the target object 20 with high accuracy while broadening the distance measurement range.

Second Embodiment

An optical distance measurer 100a according to a second embodiment will be described by referring to FIG. 7.

The optical distance measurer 100a is obtained by replacing the laser light source 101 and the wavelength sweeper 102 in the optical distance measurer 100 according to the first embodiment with a laser light source 101a. Furthermore, in the optical distance measurer 100a, the transmitter 110, the first receiver 141, the second receiver 142, the frequency meter 181, and the distance calculator 182 in the optical distance measurer 100 according to the first embodiment are replaced with a transmitter 110a, a first receiver 141a, a second receiver 142a, a frequency meter 181a, and a distance calculator 182a, respectively.

FIG. 7 is a block diagram illustrating an example of the configuration of the main part of the optical distance measurer 100a according to the second embodiment.

The optical distance measurer 100a includes the laser light source 101a, a beam splitter 103a, a measurement light beam splitter 104, a reference light beam splitter 105, a delay adjustor 106, a first optical circulator 121, a second optical circulator 122, a first optical system 131, a second optical system 132, a first synthesizer 153, a second synthesizer 154, a first spectrometer 155, a second spectrometer 156, a first photoelectric convertor 161a, a second photoelectric convertor 162a, a first digital convertor 171a, a second digital convertor 172a, the frequency meter 181a, the distance calculator 182a, and an information transmitter 190.

In the configuration of the optical distance measurer 100a, components similar to those of the optical distance measurer 100 are denoted by the same symbol, and redundant description will be omitted. That is, description will be omitted for a component in FIG. 7 denoted by the same symbol as that in FIG. 1.

The laser light source 101a emits a laser beam that is continuous light. In the second embodiment, the laser light source 101a is a light source that includes an amplified spontaneous emission (ASE) light source or the like and emits a laser beam having a plurality of frequencies.

The laser light source 101a is not an essential component in the optical distance measurer 100a according to the second embodiment. For example, the optical distance measurer 100a may operate by receiving a laser beam emitted from an external laser beam generating device including the laser light source 101a.

The beam splitter 103a includes an optical coupler or the like, splits the laser beam of a continuous wave that has been input thereto, and outputs the split laser beam as measurement light and reference light. More specifically, the beam splitter 103a splits the laser beam having the plurality of frequencies emitted from the laser light source 101a and outputs the laser beam that has been split as measurement light and reference light.

In the optical distance measurer 100a according to the second embodiment, a transmitter 110a includes the laser light source 101a, the beam splitter 103a, the measurement light beam splitter 104, the reference light beam splitter 105, the delay adjustor 106, the first optical circulator 121, the second optical circulator 122, the first optical system 131, and the second optical system 132.

The first synthesizer 153 includes an optical coupler or the like, combines the first reference light and the first reflection light into a synthesizing beam and outputs the synthesizing beam as first synthesized light.

The first spectrometer 155 includes a diffraction grating or the like, spatially spectrally disperses the first synthesized light into a dispersing beam and emits the dispersing beam as first spectral light. The first synthesized light is the output of the first synthesizer 153.

The first photoelectric convertor 161a has photoelectric elements arranged in an array. The photoelectric elements receive the first spectral light emitted from the first spectrometer 155. Each of the photoelectric elements is placed in a position where a corresponding spectrum from the first spectrometer 155 is emitted. The first photoelectric convertor 161a outputs a first analog signal having information on the intensity of the first synthesized light.

The first digital convertor 171a A/D converts the first analog signal into a digital signal and outputs the digital signal as a first receiving signal.

In the optical distance measurer 100a according to the second embodiment, the first receiver 141a includes the first synthesizer 153, the first spectrometer 155, the first photoelectric convertor 161a, and the first digital convertor 171a.

In other words, the first receiver 141a receives the first reference light and the first reflection light and outputs the first receiving signal indicating the first reference light and the first reflection light. The first reflection light is a reflected light reflected at the target object 20 and is originally the first measurement light.

The second synthesizer 154 includes an optical coupler or the like, combines the second reference light and the second reflection light into another synthesizing beam and outputs the other synthesizing beam as second synthesized light.

The second spectrometer 156 includes a diffraction grating or the like, spatially spectrally disperses the second synthesized light into another dispersing beam and emits the other dispersing beam as second spectral light. The second synthesized light is the output of the second synthesizer 154.

The second photoelectric convertor 162a has other photoelectric elements arranged in an array. The other photoelectric elements receive the second spectral light emitted from the second spectrometer 156. Each of the other photoelectric elements is placed in a position where a corresponding spectrum from the second spectrometer 156 is emitted. The second photoelectric convertor 162a outputs a second analog signal having information on the intensity of the second synthesized light.

The second digital convertor 172a A/D converts the second analog signal into another digital signal and outputs the other digital signal as a second receiving signal.

In the optical distance measurer 100a according to the second embodiment, the second receiver 142a includes the second synthesizer 154, the second spectrometer 156, the second photoelectric convertor 162a, and the second digital convertor 172a.

In other words, the second receiver 142a receives the second reference light and the second reflection light and outputs the second receiving signal having information on both the second reference light and the second reflection light. The second reflection light is another reflected light reflected at the target object 20 and is originally the second measurement light.

The frequency meter 181a, for each frequency component, measures the intensity of the first reference light and the first reflection light by referring to the first receiving signal. In addition, for each frequency component, the frequency meter 181a outputs first signal information having information on the intensity of the first reference light and the first reflection light.

The frequency meter 181a, for each frequency component, also measures the intensity of the second reference light and the second reflection light by referring to the second receiving signal. In addition, for each frequency component, the frequency meter 181a outputs second signal information having information on the intensity of the second reference light and the second reflection light.

More specifically, for example, the frequency meter 181a measures the intensities of the first reference light and the first reflection light for each frequency component by referring to information in which the frequency is associated with the position of each of the photoelectric elements arranged in the array in the first photoelectric convertor 161a and information indicating the intensity of the first synthesized light in the first receiving signal associated with the position of each of the photoelectric elements arranged in the array. Note that it is assumed that the information in which the frequency is associated with the position of each of the photoelectric elements arranged in the array in the first photoelectric convertor 161a is known. Similarly, the frequency meter 181a measures the intensities of the second reference light and the second reflection light for each frequency component by referring to information in which the frequency is associated with the position of each of the photoelectric elements arranged in the array in the second photoelectric convertor 162a and information indicating the intensity of the second synthesized light in the second receiving signal associated with the position of each of the photoelectric elements arranged in the array. Note that it is assumed that the information in which the frequency is associated with the position of each of the photoelectric elements arranged in the array in the second photoelectric convertor 162a is known.

The distance calculator 182a calculates the distance from the transmitter 110a to the target object 20 by referring to either the first signal information or the second signal information, both of which is an output of the frequency meter 181a. Furthermore, the distance calculator 182a outputs distance information, the calculated result, indicating the distance from the transmitter 110a to the target object 20.

More specifically, the distance calculator 182a calculates the distance from the transmitter 110a to the target object 20 by referring to either the first signal information or the second signal information by a method similar to an optical coherence tomography based on a spectrum domain interferometry which is well-known technology. Since the distance measurement method using an optical coherence tomography based on a spectrum domain interferometry is known, description thereof is omitted.

As described above, the optical distance measurer 100a includes: the transmitter 110a including: the beam splitter 103a for splitting a laser beam into measurement light and reference light and outputting the measurement light and the reference light, the laser beam the input of the beam splitter 103a being a continuous wave having a plurality of frequencies; the measurement light beam splitter 104 splitting the measurement light into first measurement light and second measurement light and outputting the first measurement light and the second measurement light; the reference light beam splitter 105 splitting the reference light into first reference light and second reference light and outputting the first reference light and the second reference light; the first optical system 131 having a first Rayleigh length, the first optical system 131 emitting the first measurement light to a target object 20; and the second optical system 132 having a second Rayleigh length different from the first Rayleigh length and a focal length equal to the focal length of the first optical system 131, the second optical system 132 emitting the second measurement light to the target object 20; wherein the first receiver 141a receives the first reference light and the first reflection light and outputs a first receiving signal having information on both the first reference light and the first reflection light, the first reflection light being a reflected light reflected at the target object 20 and originally being the first measurement light; and the second receiver 142*a* receives the second reference light and the second reflection light and outputs the second receiving signal having information on both the second reference light and the second reflection light, the second reflection light being another reflected light reflected at the target object 20 and originally being the second measurement light, in which the first receiver 141*a* includes: the first synthesizer 153 combining the first reference light and the first reflection light into a synthesizing beam and outputting the synthesizing beam as first synthesized light; the first spectrometer 155 spatially spectrally dispersing the first synthesized light into a dispersing beam and emitting the dispersing beam as first spectral light; and the first photoelectric convertor 161*a* including photoelectric elements arranged in an array, the photoelectric elements receiving the first spectral light, each of the photoelectric elements being in a position where a corresponding spectrum from the first spectrometer 155 is emitted, the first photoelectric convertor 161*a* outputting information on intensity of the first synthesized light as the first receiving signal, and the second receiver 142*a* includes: the second synthesizer 154 combining the second reference light and the second reflection light into another synthesizing beam and outputting the other synthesizing beam as second synthesized light; the second spectrometer 156 spatially spectrally dispersing the second synthesized light into another dispersing beam and emitting the other dispersing beam as second spectral light; and the second photoelectric convertor 162*a* including other photoelectric elements arranged in an array, the other photoelectric elements receiving the second spectral light, each of the other photoelectric elements being in a position where a corresponding spectrum from the second spectrometer 156 is emitted, the second photoelectric convertor 162*a* outputting information on intensity of the second synthesized light as the second receiving signal.

With this configuration, the optical distance measurer 100*a* can measure the distance from the transmitter 110*a* to the target object 20 with high accuracy while broadening the distance measurement range.

Note that the present invention may include a flexible combination of the embodiments, a modification of any component of the embodiments, or an omission of any component in the embodiments within the scope of the present invention.

INDUSTRIAL APPLICABILITY

An optical distance measurer according to the present invention is applicable to a machining apparatus.

REFERENCE SIGNS LIST

10: machining apparatus, 11: machining head, 12: chuck, 13: machining head movement controller, 14: machining head moving mechanism, 15: chuck movement controller, 16: chuck moving mechanism, 20: target object, 100, 100*a*: optical distance measurer, 101: laser light source, 101*a*: laser light source, 102: wavelength sweeper, 103, 103*a*: beam splitter, 104: measurement light beam splitter, 105: reference light beam splitter, 106: delay adjustor, 110, 110*a*: transmitter, 121: first optical circulator, 122: second optical circulator, 131: first optical system, 132: second optical system, 141, 141*a*: first receiver, 142, 142*a*: second receiver, 151: first optical interferometer, 152: second optical interferometer, 153: first synthesizer, 154: second synthesizer, 155: first spectrometer, 156: second spectrometer, 161, 161*a*: first photoelectric convertor, 162, 162*a*: second photoelectric convertor, 171, 171*a*: first digital convertor, 172, 172*a*: second digital convertor, 181, 181*a*: frequency meter, 182, 182*a*: distance calculator, 190: information transmitter.

The invention claimed is:

1. An optical distance measurer comprising a transmitter, a first receiver, and a second receiver,
    the transmitter comprising:
        a beam splitter splitting a laser beam into measurement light and reference light and outputting the measurement light and the reference light, the laser beam, the input of the beam splitter, being a continuous wave;
        a measurement light beam splitter splitting the measurement light into first measurement light and second measurement light and outputting the first measurement light and the second measurement light;
        a reference light beam splitter splitting the reference light into first reference light and second reference light and outputting the first reference light and the second reference light;
        a first optical system having a first Rayleigh length, the first optical system emitting the first measurement light to a target object; and
        a second optical system having a second Rayleigh length different from the first Rayleigh length and a focal length equal to a focal length of the first optical system, the second optical system emitting the second measurement light to the target object;
    wherein the first receiver receives the first reference light and first reflection light and outputs a first receiving signal having information on both the first reference light and the first reflection light, the first reflection light being a reflected light reflected at the target object and originally being the first measurement light; and
    the second receiver receives the second reference light and second reflection light and outputs the second receiving signal having information on both the second reference light and the second reflection light, the second reflection light being another reflected light reflected at the target object and originally being the second measurement light.

2. The optical distance measurer according to claim 1, further comprising:
    a frequency meter, for each frequency component, measuring intensities of the first reference light and the first reflection light by referring to the first receiving signal and outputting first signal information having information on the intensities of the first reference light and the first reflection light, also, for each frequency component, measuring intensities of the second reference light and the second reflection light by referring to the second receiving signal and outputting second signal information having information on the intensities of the second reference light and the second reflection light; and
    a distance calculator calculating a distance from the transmitter to the target object by referring to either the first signal information or the second signal information and outputting distance information having information on the distance from the transmitter to the target object.

3. The optical distance measurer according to claim 2,
    wherein the frequency meter, by referring to a composite signal of the first receiving signal and the second receiving signal, for each frequency component, measures the intensities of the first reference light and the first reflection light and outputs the first signal information having information on the intensities of the first reference light and the first reflection light.
4. The optical distance measurer according to claim 2,
wherein the measurement light beam splitter, by using polarization separation, splits the measurement light into first polarization measurement light and second polarization measurement light and outputs the first polarization measurement light as the first measurement light and the second polarization measurement light as the second measurement light, and
the reference light beam splitter, by using polarization separation, splits the reference light into first polarization reference light and second polarization reference light and outputs the first polarization reference light as the first reference light and the second polarization reference light as the second reference light.
5. The optical distance measurer according to claim 4,
wherein the frequency meter, by using a polarization diversity method, for each frequency component, measures the intensities of the first reference light and the first reflection light by referring to either the first receiving signal or the second receiving signal and outputs the first signal information having information on the intensities of the first reference light and the first reflection light.
6. The optical distance measurer according to claim 1,
wherein the transmitter further comprises:
a wavelength sweeper wavelength-sweeping the laser beam and outputting the laser beam as a sweep light,
the beam splitter splits the sweep light into two beams of light and outputs the two beams of light as the measurement light and the reference light,
wherein the first receiver comprises:
a first optical interferometer interfering the first reference light and the first reflection light into an interference light and outputting the interference light as first interference light;
a first photoelectric convertor photoelectrically converting the first interference light into an analog signal and outputting the analog signal as first analog signal; and
a first digital convertor A/D converting the first analog signal into a digital signal and outputting the digital signal as the first receiving signal, and
and wherein the second receiver comprises:
a second optical interferometer interfering the second reference light and the second reflection light into another interference light and outputting the other interference light as second interference light;
a second photoelectric convertor photoelectrically converting the second interference light into another analog signal and outputting the other analog signal as second analog signal; and
a second digital convertor A/D converting the second analog signal into another digital signal and outputting the other digital signal as the second receiving signal.
7. The optical distance measurer according to claim 1,
wherein the beam splitter splits the laser beams, the laser beam having a plurality of frequencies, and
wherein the first receiver comprises:
a first synthesizer combining the first reference light and the first reflection light into a synthesizing beam and outputting the synthesizing beam as first synthesized light;
a first spectrometer spatially spectrally dispersing the first synthesized light into a dispersing beam and emitting the dispersing beam as first spectral light; and
a first photoelectric convertor having photoelectric elements arranged in an array, the photoelectric elements receiving the first spectral light, each of the photoelectric elements being in a position where a corresponding spectrum from the first spectrometer is emitted, the first photoelectric convertor outputting information on intensity of the first synthesized light as the first receiving signal,
and wherein the second receiver comprises:
a second synthesizer combining the second reference light and the second reflection light into another synthesizing beam and outputting the other synthesizing beam as second synthesized light;
a second spectrometer spatially spectrally dispersing the second synthesized light into another dispersing beam and emitting the other dispersing beam as second spectral light; and
a second photoelectric convertor having other photoelectric elements arranged in an array, the other photoelectric elements receiving the second spectral light, each of the other photoelectric elements being in a position where a corresponding spectrum from the second spectrometer is emitted, the second photoelectric convertor outputting information on intensity of the second synthesized light as the second receiving signal.

* * * * *